M. DE CAMP.
Grain Feeder.

No. 54,126.

Patented April 24, 1866.

Witnesses.
Wm Travin
Thos Tusch

Inventor
M. De Camp
Per Munn & Co Attys

UNITED STATES PATENT OFFICE.

M. DECAMP, OF SOUTH BEND, INDIANA.

IMPROVEMENT IN REVOLVING GRAIN-FEEDERS.

Specification forming part of Letters Patent No. 54,126, dated April 24, 1866.

*To all whom it may concern:*

Be it known that I, M. DECAMP, of South Bend, in the county of St. Joseph and State of Indiana, have invented new and useful Improvements in Grain-Feeders; and I do hereby declare that the following is a full, clear, and exact description thereof, which will enable others skilled in the art to make and use the same, reference being had to the accompanying drawings, forming part of this specification.

The present invention relates to certain new and useful improvements in feeders for grain, to be used either in mills or warehouses where grain is stored, and frequently removed from one place to another by conveyers or elevators, or it can be applied to separators and other machines employed for the sifting and separating of grain; and it consists in the use of a roller having a series of scrapers attached to or inserted in its periphery for its entire length, in a spiral form, or stair-sections arranged in a spiral relation to each other.

The grain to be separated, or in any other manner manipulated, is fed through any suitable hopper, the roller at the same time being revolved in the proper direction by means of any suitable arrangement of devices, connecting it with the driving power used, thereby feeding the grain by its scrapers or corrugations, as desired.

Among the many advantages of my improved feeder for grain may be here mentioned that there is not the least possibility of its being choked up or blocked with straws, sticks, &c.; that the feed-roller regulates itself according to the operation of the mill without the necessity, as heretofore, of opening and closing slides or gates, the importance of which is evident, and that there is no occasion for repairs of the same.

Figure 1:
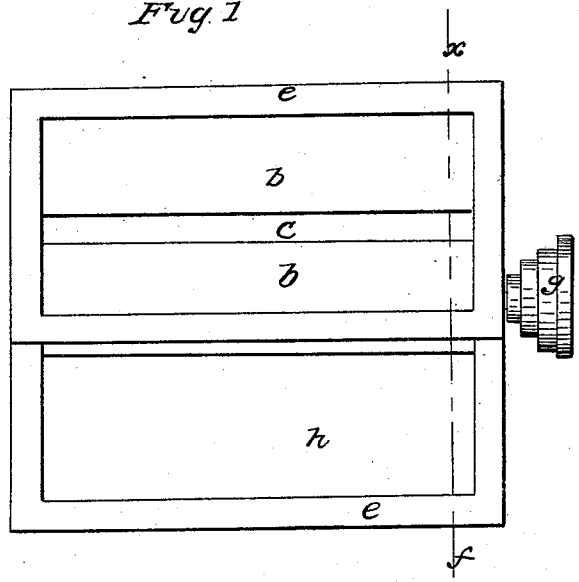
Figure 2:
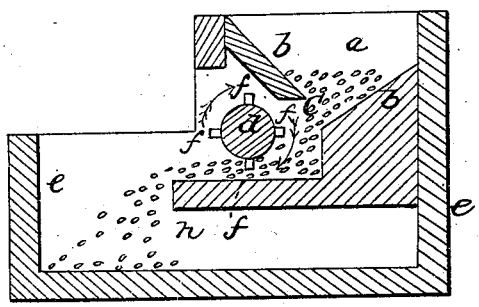
Figure 3:
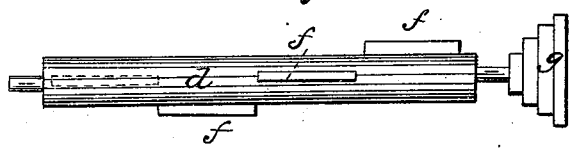

In accompanying plate of drawings my improvement is represented, Figure 1 being a plan or top view of my feeder with a hopper attached; Fig. 2, a transverse vertical section in plane of line $x\,x$, Fig. 1; and Fig. 3, a detail view of the roller detached from the hopper.

$a\,a$ in the drawings represent a hopper made with two inclined sides, $b\,b$, with an opening, $c$, at their lower ends, at which opening, for its entire length, is placed a roller, $d$, hung and turning in suitable bearings of the frame $e$, at each end. This roller has upon its periphery, and extending in the direction of its length, a series of sectional scrapers, $fff$, &c., which may be either arranged straight or spirally, as may be desired, by which scrapers, as the roller is revolved through any suitable devices connecting it by its pulley $g$ with the driving-power used, the grain is fed from the said hopper, dropping into the box or receptacle $h$, or to a separator or any other desired machine or place, as is evident without further description, the advantages of which has been hereinbefore partially stated.

In lieu of the projecting scrapers on the roller, as described, it may be made in a corrugated form with the corrugations either extending in a spiral or straight direction.

By constructing the feed-roller as described and giving it a horizontal rotary motion said roller may be made longer or shorter, as the nature of the case may require, and when applied to various kinds of mills, separators, conveyers, &c., will feed with accuracy and dispatch more or less in quantity, as needed.

The feeder operates with the working of the machine with which it is connected, stops and starts with it, but at the same time, if required, the feeding may be cut off independently.

I claim as new and desire to secure by Letters Patent—

The roller $d$, provided with spirally-arranged scrapers $fff$, in combination with the inclined sides $b$, and opening $c$, the several parts being arranged and operating as and for the purpose specified.

MICHAEL DECAMP.

Witnesses:
WM. H. STANFIELD,
CHARLES A. BONZ.